April 22, 1952  E. A. VERRINDER ET AL  2,594,100
NAILING MACHINE
Filed Oct. 29, 1949  12 Sheets-Sheet 4
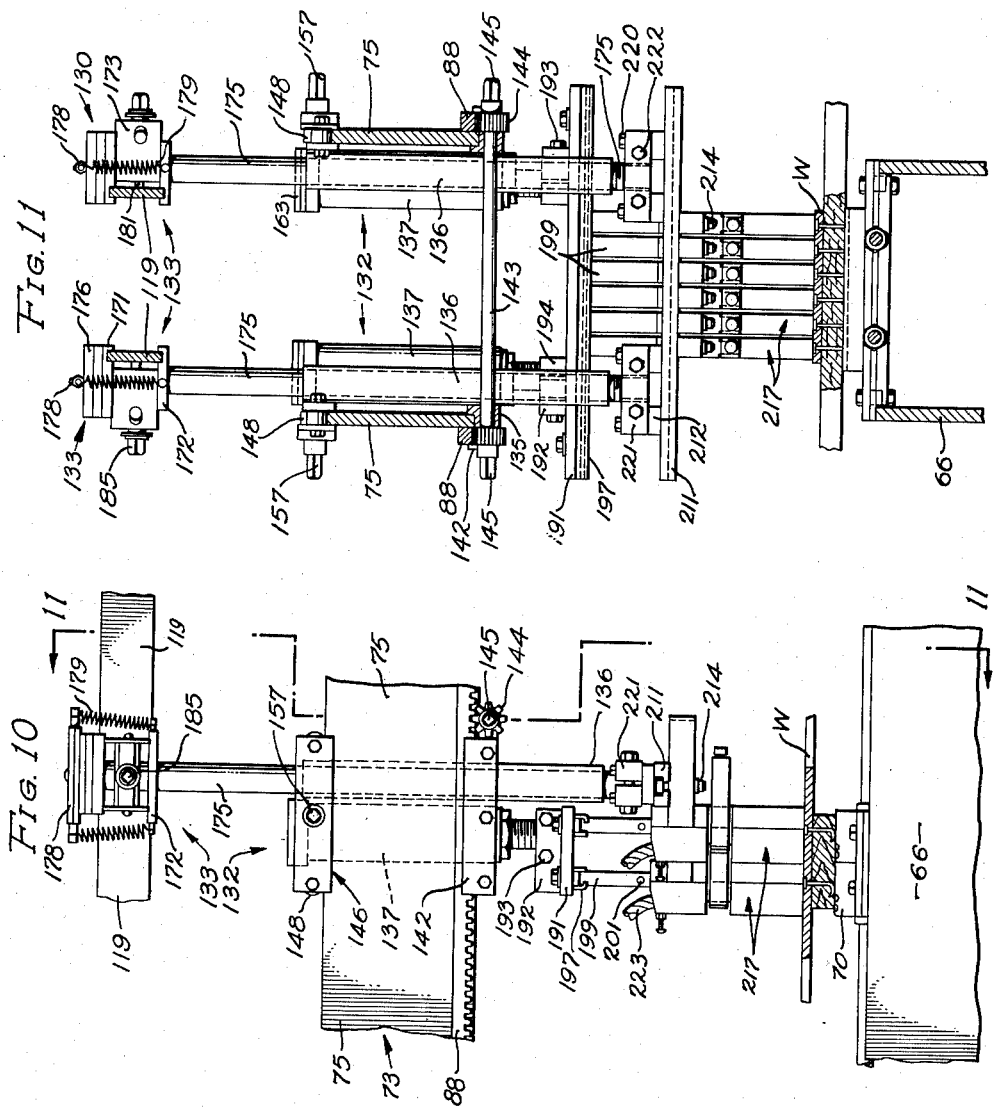
ERNEST A. VERRINDER
REGINALD H. HEARD
INVENTORS
BY
ATTORNEY

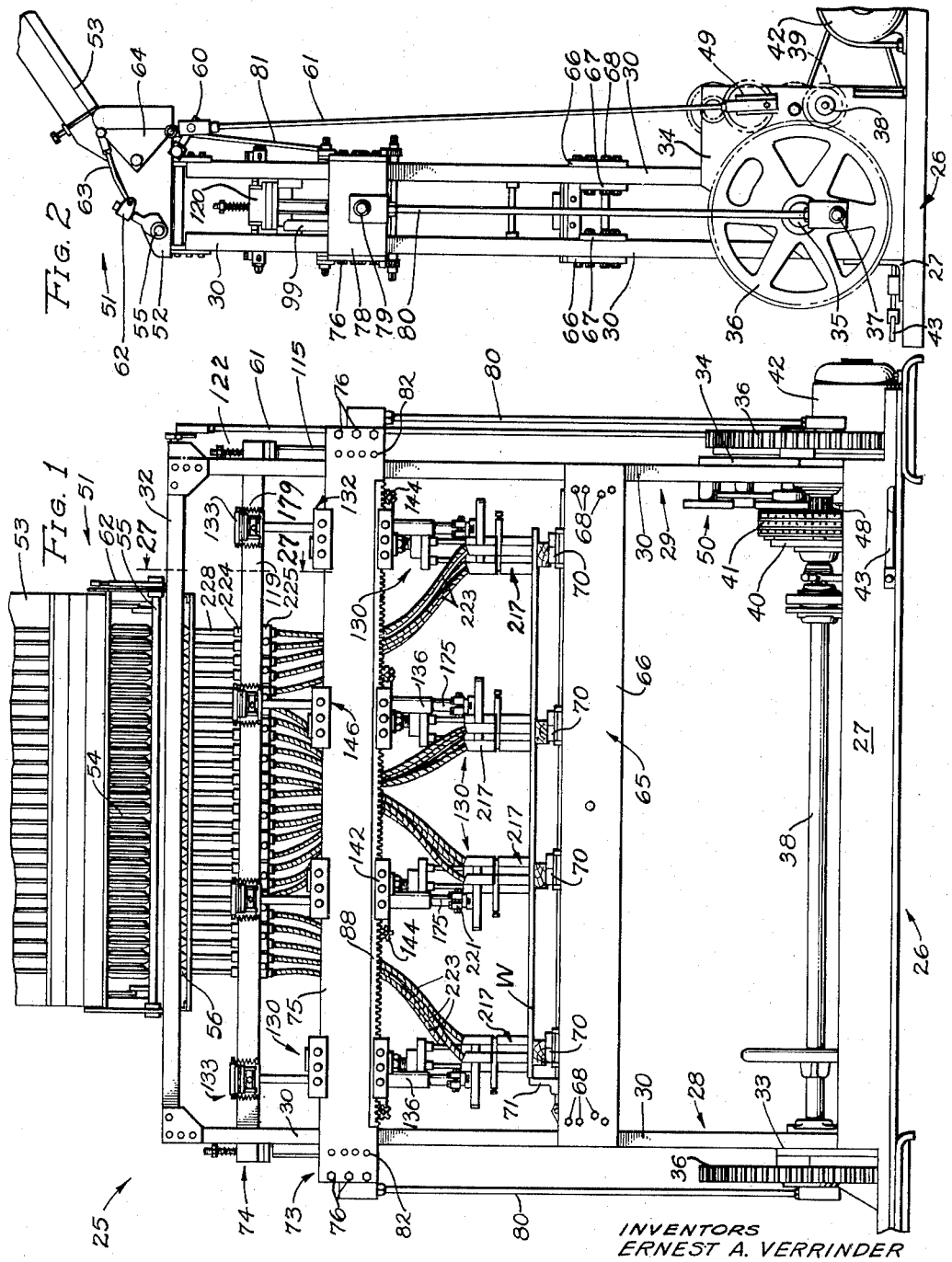

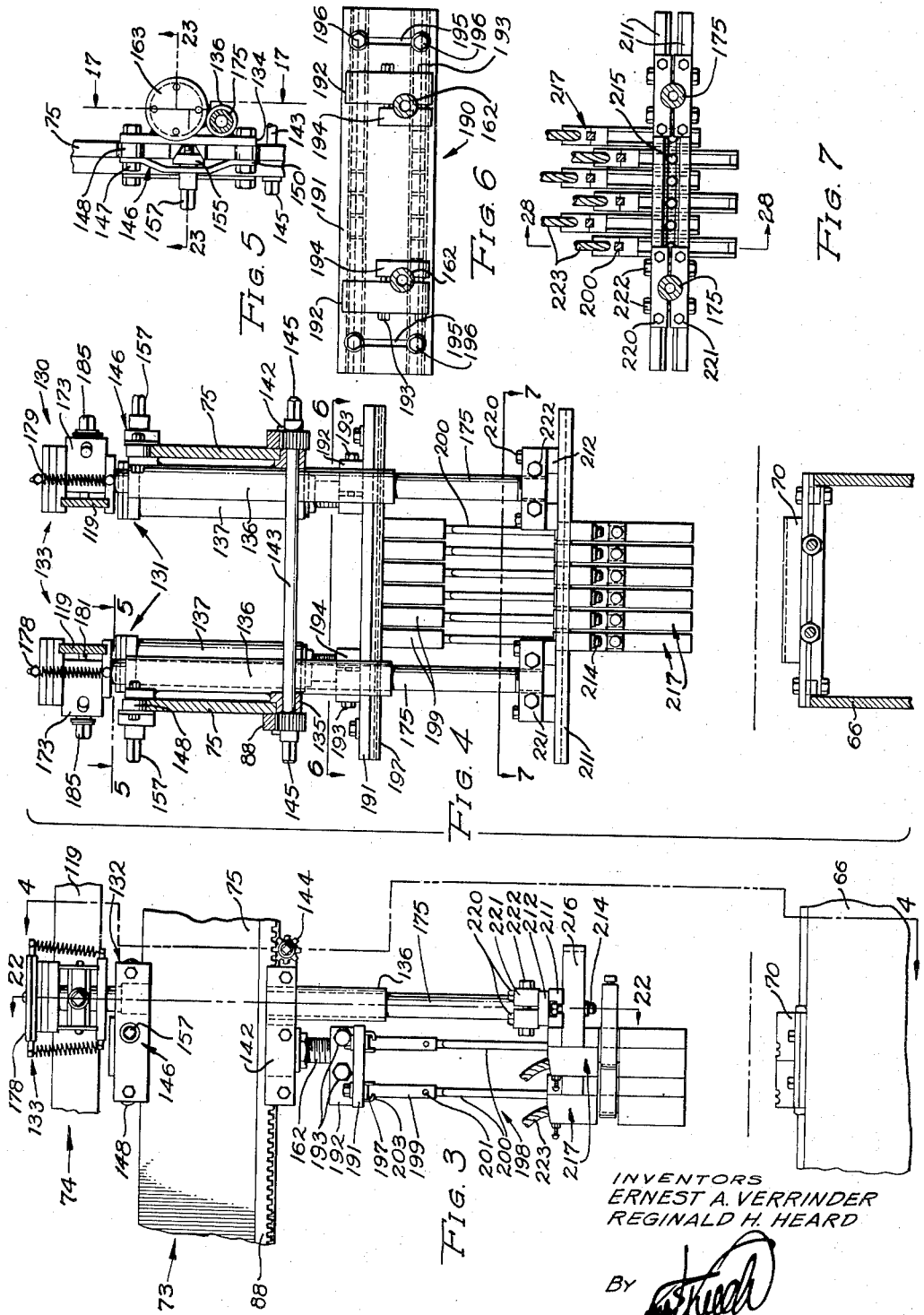

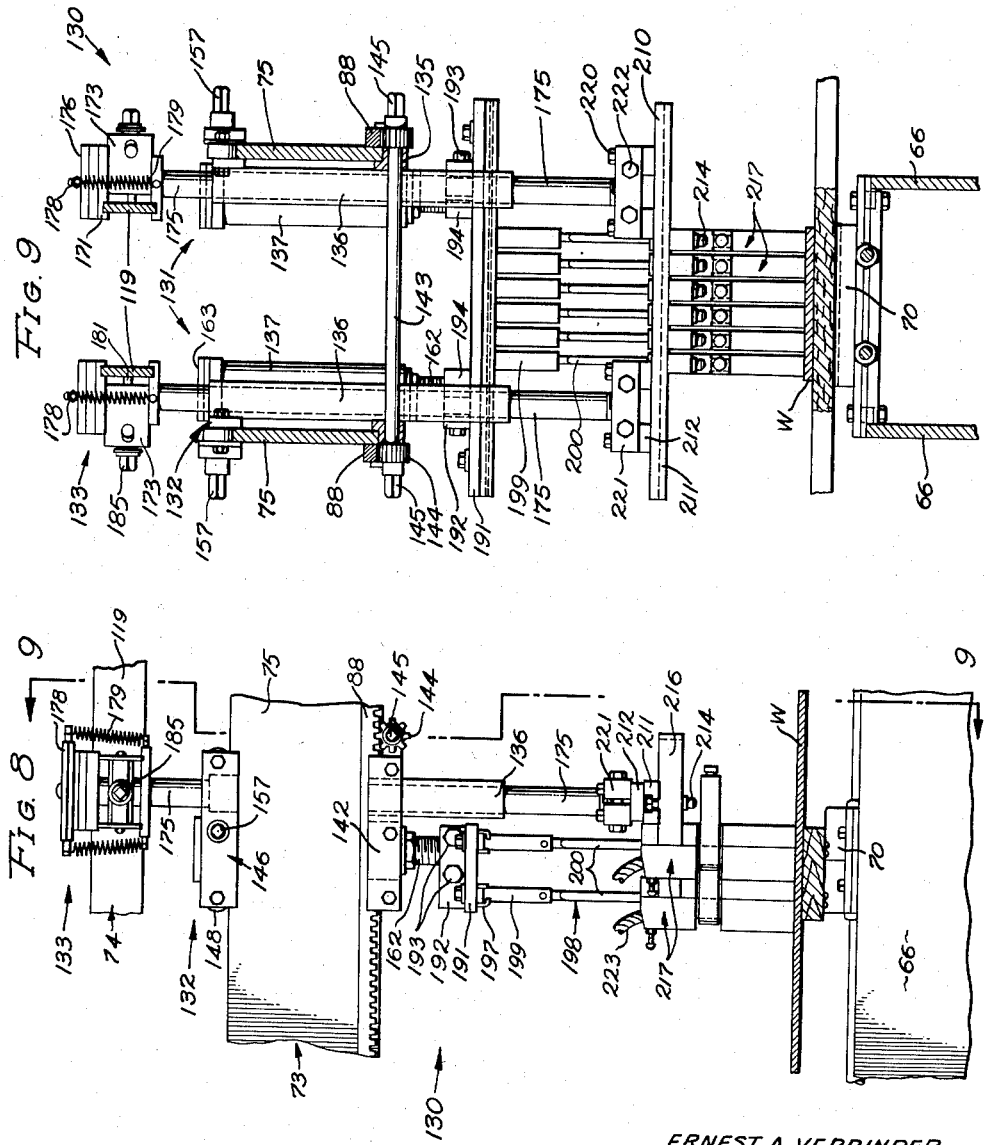

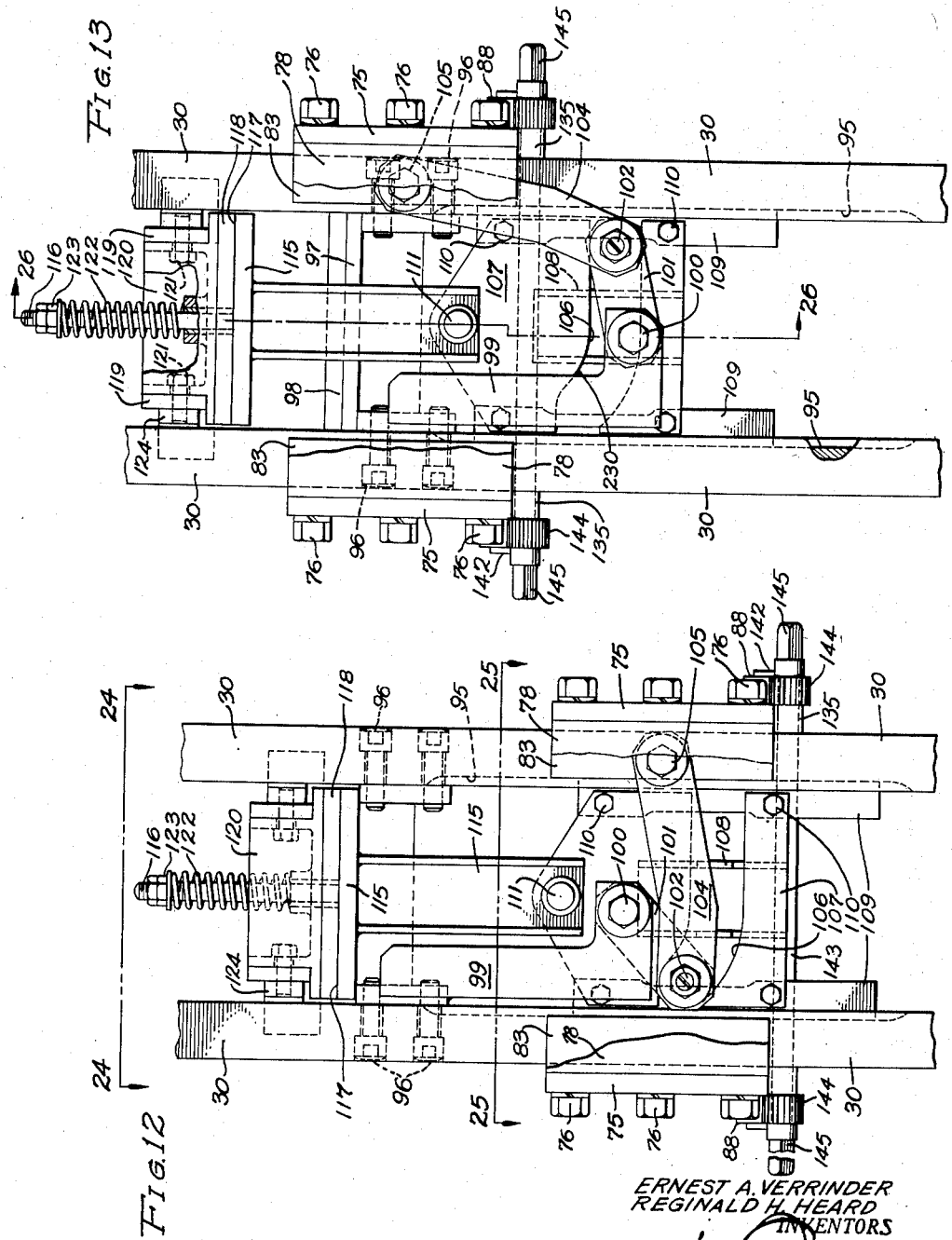

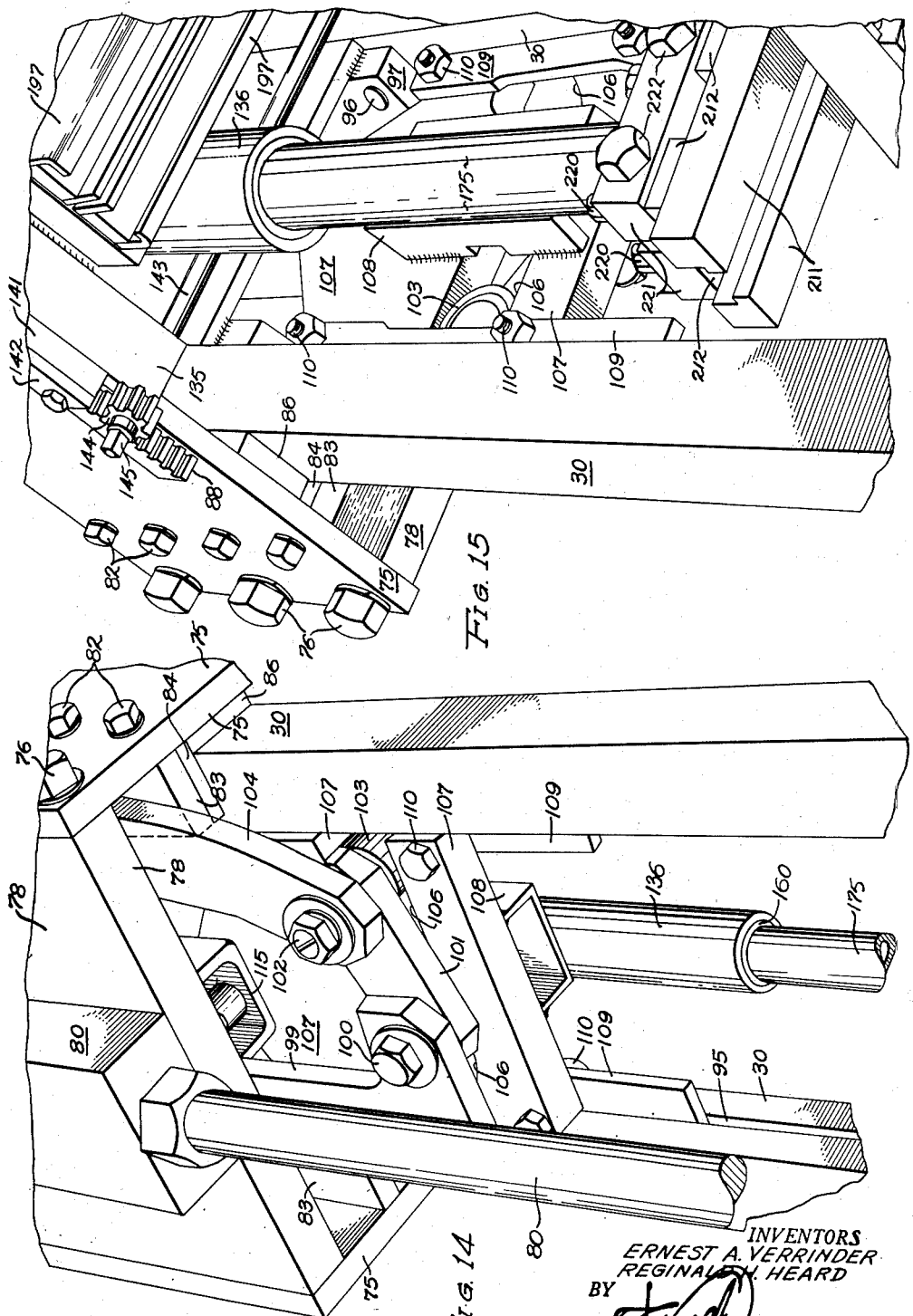

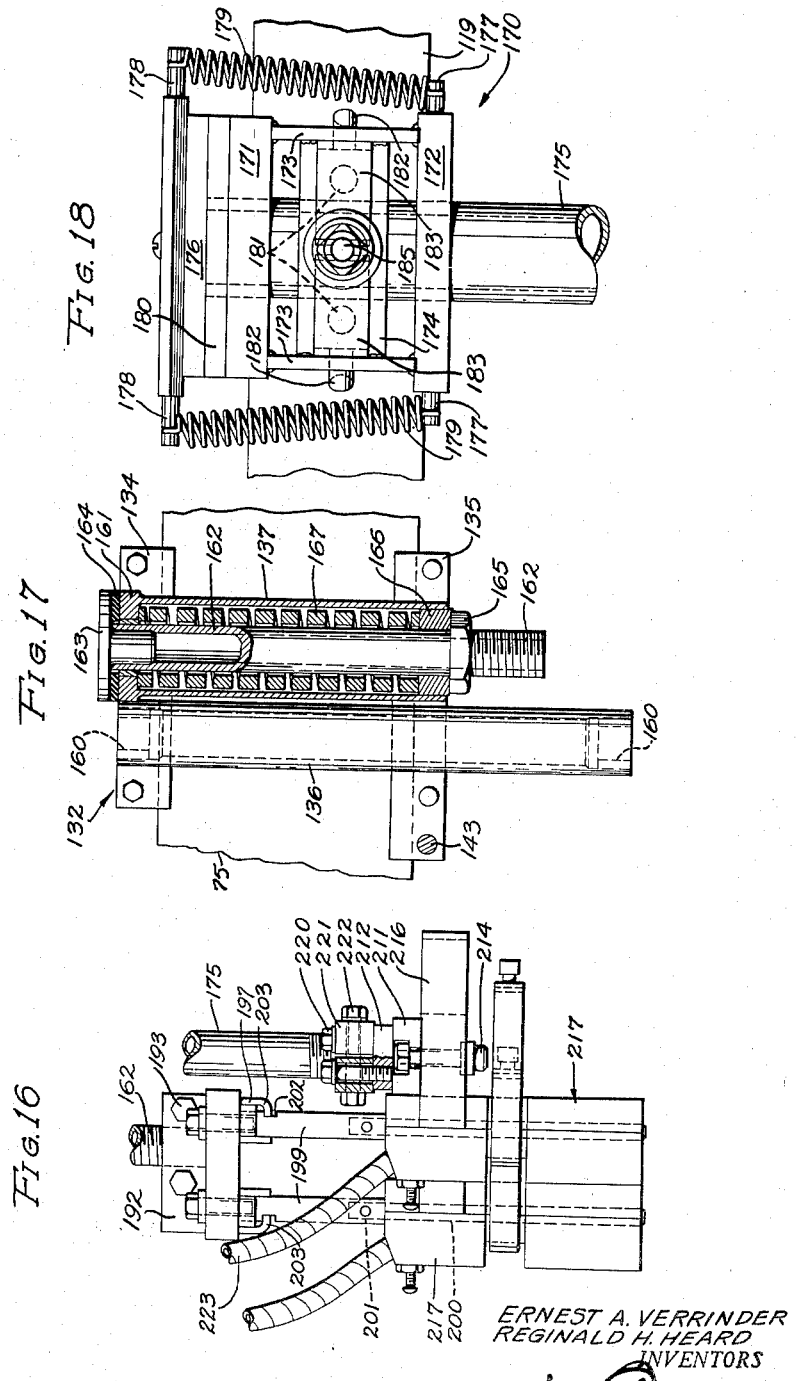

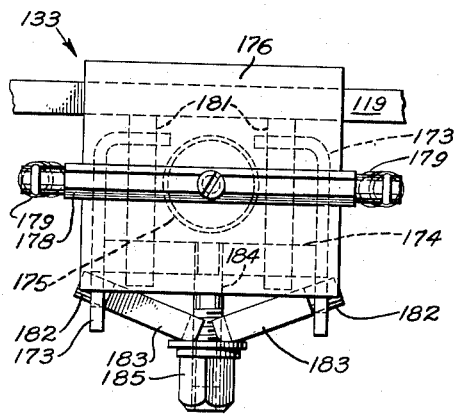
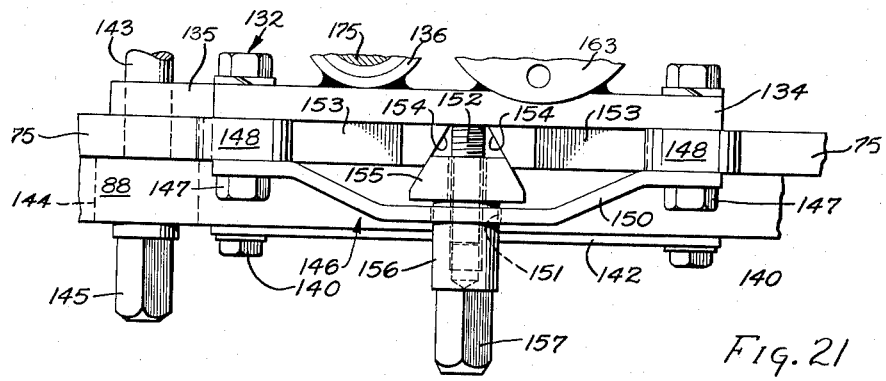
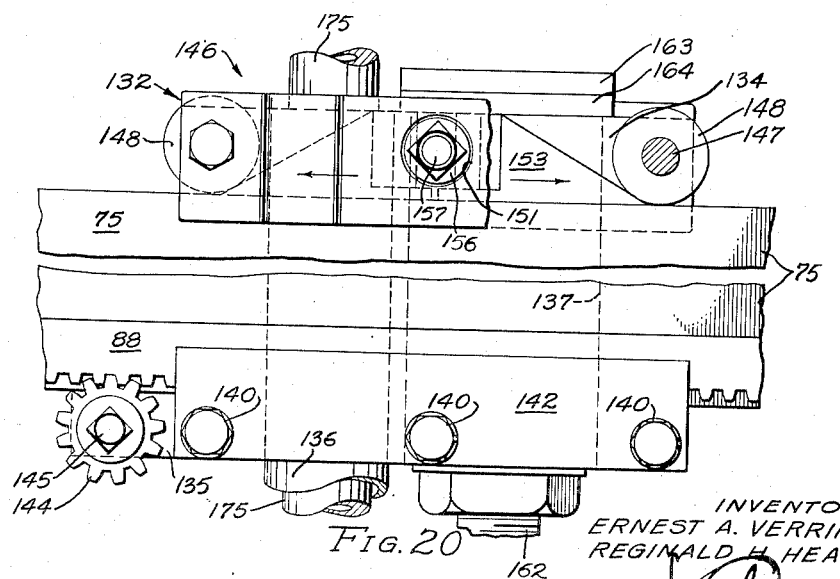

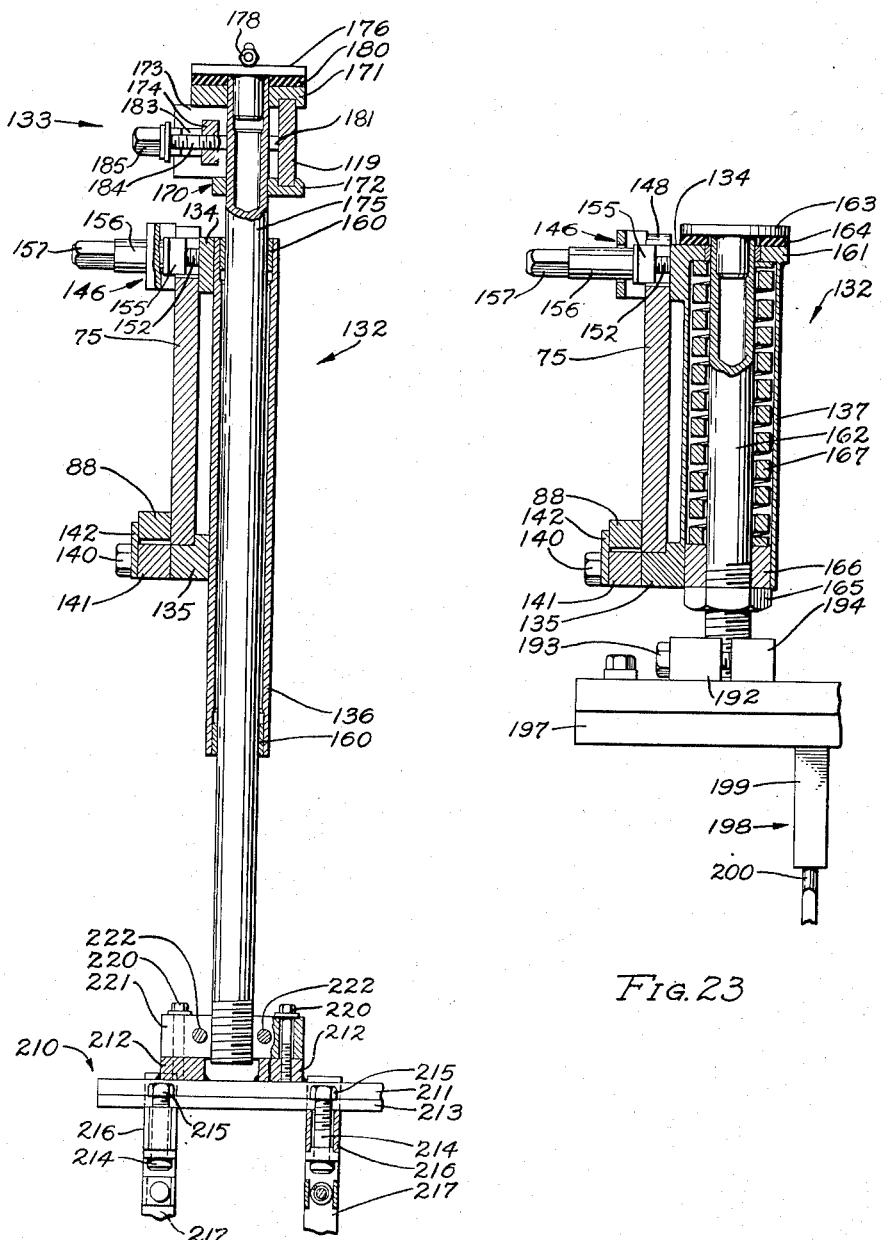

April 22, 1952   E. A. VERRINDER ET AL   2,594,100
NAILING MACHINE

Filed Oct. 29, 1949   12 Sheets-Sheet 10

ERNEST A. VERRINDER
REGINALD H. HEARD
INVENTORS.

BY

ATTORNEY

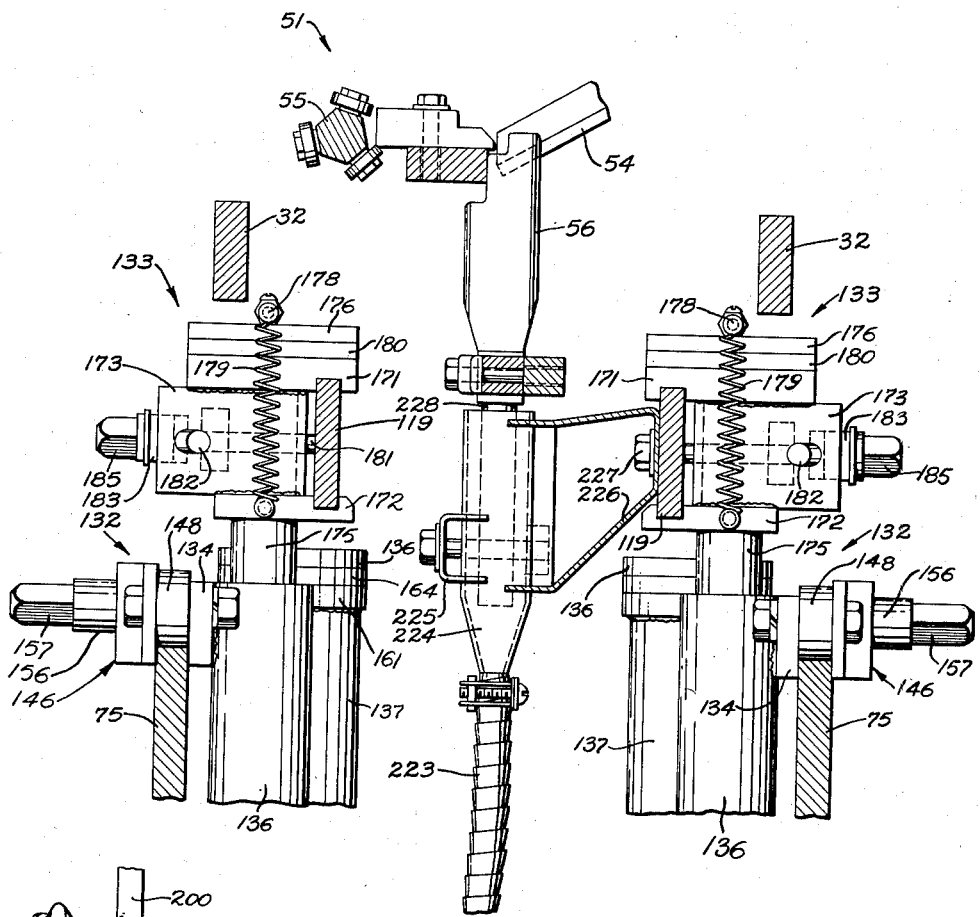

Patented Apr. 22, 1952

2,594,100

UNITED STATES PATENT OFFICE 2,594,100

NAILING MACHINE

Ernest A. Verrinder and Reginald H. Heard, Riverside, Calif., assignors to Food Machinery and Chemical Corporation, San Jose, Calif., a corporation of Delaware Application October 29, 1949, Serial No. 124,275

13 Claims. (Cl. 1—10)

This invention relates to machines for driving nails in the manufacture of boxes and the like and is particularly useful in the making of relatively large packing boxes, loading pallets and similar articles of wood used industrially.

It is an object of the invention to provide such a machine which is relatively simple in design, inexpensive to manufacture and which is highly flexible in its adaptability for the driving of nails in a wide variety of patterns.

Another object of the invention is to provide a novel mechanism for compensating for variations in the thickness of the wood pieces being worked upon in successive nail driving operations.

The manner of accomplishing the foregoing objects as well as other objects and advantages will be made clear in the following description taken in connection with the accompanying drawings in which:

Fig. 1 is a front elevational view of a preferred embodiment of this invention with the parts thereof shown as positioned at the mid-point in a nail driving cycle of operation.

Fig. 2 is a right side elevational view of the machine shown in Fig. 1.

Fig. 3 is an enlarged fragmentary portion of Fig. 1 illustrating certain parts positioned as at the initiation of a nailing cycle.

Fig. 4 is a sectional view taken on the line 4—4 of Fig. 3.

Fig. 5 is a detailed fragmentary plan view of a nailing unit attaching clamp of the invention.

Fig. 6 is a horizontal sectional view taken on line 6—6 of Fig. 4 and illustrates in plan a nail driver support of the invention.

Fig. 7 is a horizontal sectional view taken on line 7—7 of Fig. 4 and illustrates in plan a nail chuck support of the invention.

Fig. 8 is a view similar to Fig. 3 which shows a piece of work positioned on a nailing anvil and with the chucks resting on said work, and with the nail drivers descending to drive nails from said chucks into said work.

Fig. 9 is a vertical sectional view taken on the line 9—9 of Fig. 8.

Fig. 10 is a view similar to Fig. 8 illustrating the parts of the invention as they are positioned at the moment the aforesaid downward nail driving movement is completed, which is to say at the mid-point in the nailing cycle.

Fig. 11 is a vertical sectional view taken on the line 11—11 of Fig. 10.

Fig. 12 is an enlarged fragmentary side elevational view of the mechanism through which the chuck-supporting cross-head of the invention is supported and lowered and raised during the nailing cycle, this view showing said cross-head in its lowermost posiiton.

Fig. 13 is a view similar to Fig. 12 and showing both the chuck supporting head and the nail driving head of the mechanism in their uppermost positions.

Fig. 14 is an enlarged fragmentary perspective view of the mechanism shown in Fig. 13.

Fig. 15 is a fragmentary perspective view of the same mechanism from a different angle.

Fig. 16 is an enlarged detail fragmentary front elevational view of a lower portion of one of the chuck-and-driver units of the invention.

Fig. 17 is an enlarged vertical sectional view taken on line 17—17 of Fig. 5 and shows the heavy coiled spring which yields when a nail driver suspended thereon meets an excessive resistance to its downward travel.

Fig. 18 is an enlarged front elevational view of one of the secondary clamps of the invention.

Fig. 19 is a plan view of Fig. 18, and illustrates the mode of operation of said clamp.

Fig. 20 is an enlarged front elevational view of a primary clamp of the invention.

Fig. 21 is a plan view of Fig. 20.

Fig. 22 is an enlarged vertical sectional view taken on the line 22—22 of Fig. 3 and shows one of the tubular shafts of the invention sliding in a vertical bearing provided therefor and the connections of the shaft at its upper end, with a secondary slide device and, at its lower end, with a chuck support.

Fig. 23 is an enlarged vertical sectional view taken on the line 23—23 of Fig. 5 and shows a primary slide device of the invention and the manner in which this slides on one of the plates of the driver cross-head of the invention and is clamped to said plate in a preselected position thereon.

Fig. 27 is an enlarged sectional view taken on the line 27—27 of Fig. 1 and illustrates the manner of mounting the support for the flexible nail delivery tubes of the invention on the chuck supporting crosshead without interfering with the longitudinal adjustment of driver-chuck units on said crosshead.

Fig. 28 is an enlarged vertical sectional view of a nail chuck employed in said invention, said view being taken on the line 28—28 of Fig. 7.

Figure 24:
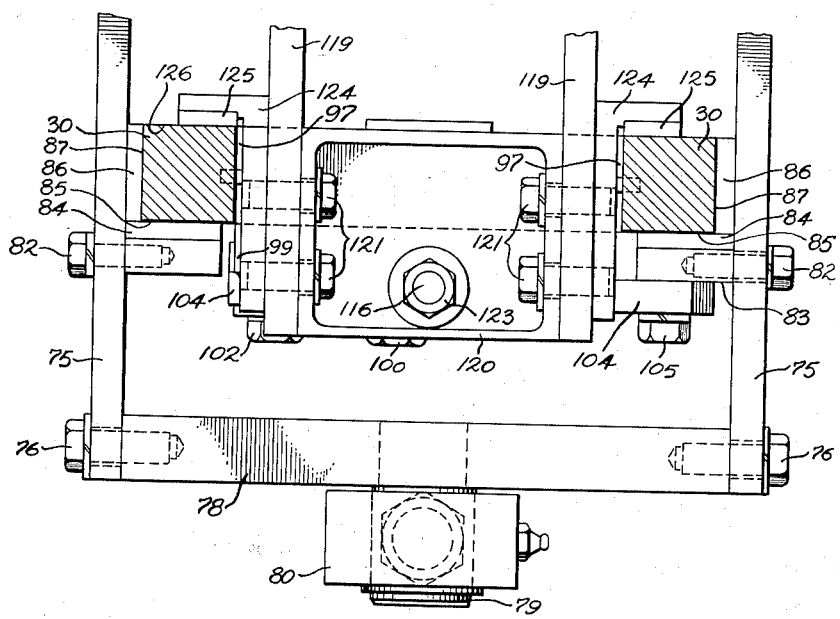
Fig. 24 is an enlarged cross sectional view taken on line 24—24 of Fig. 12 and shows, in plan, end portions of the nail driver and chuck supporting cross-heads of the invention in the vertical slidable relation these have with the square bars of the frame standards of the invention.
Figure 25:
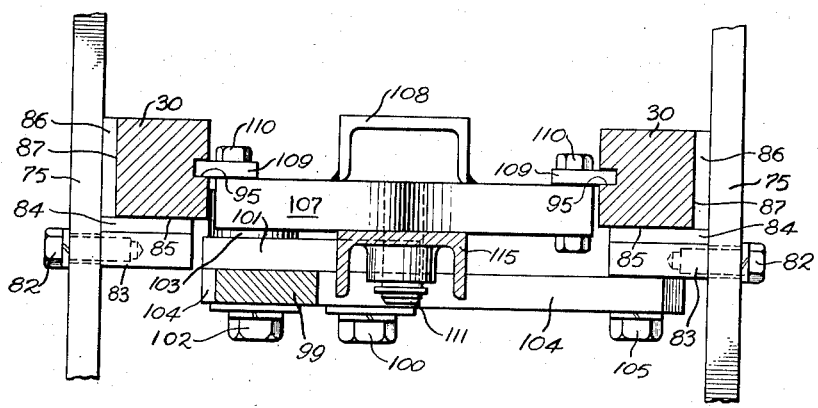
Fig. 25 is a view similar to the Fig. 24 taken on line 25—25 of Fig. 12 and illustrates the structure of the cam means of the invention for correlating the vertical movement of the two crossheads aforesaid with the latter in lowered positions.

Referring specifically to the drawings, the invention is there shown as embodied in a nailing machine 25 which is fabricated almost entirely without the use of castings and includes a frame 26 having a fabricated base 27 from opposite ends of which standards 28 and 29 rise upwardly. Each of these standards is made up of a pair of bars 30 which are square in cross section and are united at their upper ends by cross bars 32.

The standards 28 and 29 are reinforced adjacent the base 27 by vertical plates 33 and 34 providing stub shafts 35 on which crank gear wheels 36 are rotatably mounted, these wheels being provided with crank pins 37. Suitable bearings (not shown) are provided in the plates 33 and 34 for a jack shaft 38 having pinions 39 on its opposite ends which mesh with the gear wheels 36. The jack shaft 38 carries a clutch 40 which is constantly rotated through a belt 41 by a motor 42 mounted on the base 27. The clutch 40 is adapted to be controlled by a foot pedal 43, momentary depression of which results in rotation of the jack shaft 38 just long enough to cause a single revolution of the gear wheels 36.

The constantly rotating clutch 40 has a small diameter pinion sleeve which drives a crank 49 through a gear train 50 for the purpose of providing a drive for oscillating the nail pan 53, to be made clear hereinafter.

Mounted on the cross bars 32 is a nail feeding mechanism 51 which is of well known construction and is therefore not shown and described in detail. This mechanism has a frame 52 on which a nail pan 53 is pivotally mounted to deliver nails to a series of nail runs 54 from the lower ends of which nails are delivered by a picker mechanism including a rotatable control shaft 55 so as to selectively feed nails downwardly therefrom through nail funnels 56. The pan 53 is connected with a crank 60 which is connected by a pitman 61 with crank 49 so that pan 53 is constantly oscillated by the vertical rocking of the crank 60.

The control shaft 55 is rotated by a ratchet device 62 and a link 63 connecting this with a bell crank 64, the manner of actuating the latter to rotate the shaft 55 being made clear hereinafter.

Adjustably supported on the standards 28 and 29 is an anvil mount 65 made up of spaced plates 66 opposite ends of which bear against outside faces of the square bars 30 and are secured to these bars by clamps 67 which are secured to the plate ends by bolts 68 to cause said plate ends to clamp the bars 30 as shown in Fig. 2. Supported on the plates 66 are a series of anvils 70 for supporting portions of work W into which nails are to be directly driven from above. The anvils 70 may be slid lengthwise on the plates 66 to give them any desired adjusted positions on these plates. It is also to be observed that by loosening the bolts 68, the anvil mount 65 may be slid vertically on the standards 28 and 29 to any desired position relative to these standards and then rigidly clamped in this position by tightening the bolts 68.

The anvil base 65 may also have provided thereon various other devices for centering the work for performing a nailing operation thereon such as the stop 71.

In view of the square cross section of the bars 30 and their parallel relation, the standards 28 and 29 offer vertical slideways for guiding a nail-driver supporting crosshead 73 and a chuck supporting crosshead 74, disposed thereabove.

Figure 26:
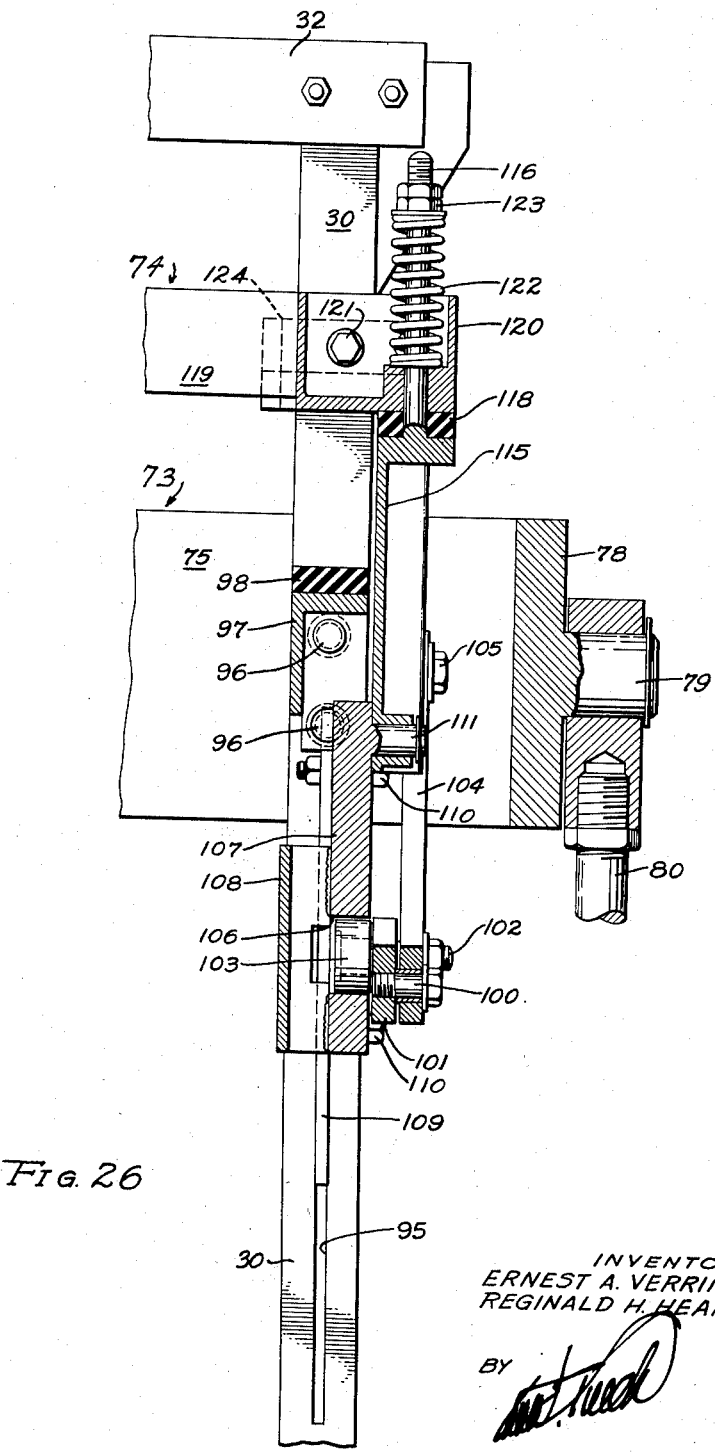
Fig. 26 is an enlarged vertical sectional view taken on the line 26—26 of Fig. 13 and illustrates the cam mechanism for correlating the vertical relation of the two cross-heads with the latter positioned as at the beginning and end of a nailing operation.

The nail driver crosshead 73 includes a pair of vertical plates 75 which are secured at their opposite ends by cap screws 76 to end plates 78 each of which carries a horizontal pin 79 (Fig. 26) which is connected by a pitman 80 to the crank pin 37 of the gear wheel 36 on that end of the machine. The crosshead 73 also is pivotally connected with the lower end of a link 81 (Fig. 2) the upper end of which connects to the bell crank 64 so as to transmit a partial rotation to the nail feed control shaft 55 with each nailing operation.

Also fixed to plates 75 (Figs. 14, 15, 24 and 25) by cap screws 82 are vertical plates 83, to inner faces of which are attached wear blocks 84 which bear against outer faces 85 of frame bars 30. Secured to inner faces of the plate 75 adjacent the blocks 84 are similar wear blocks 86 which slide against lateral faces 87 of the bars 30 (Fig. 24). The combined action of the guide blocks 84 and 86 is thus seen to guide the crosshead 73 on the vertical frame bars 30 so as to prevent endwise or transverse movement of said crosshead relative to said frame bars.

Fixed to the outer faces of the crosshead plates 75 along the lower edges thereof are gear racks 88.

Formed in inside opposed faces of the bars 30 (Figs. 13, 14, 24 and 25) of each of the standards 28 and 29 are guide grooves 95. Secured to the same faces of said bars at the upper ends of said grooves by countersunk screws 96 is a spacer 97 (Figs. 13 and 26) which carries a rubber cap 98 for a purpose of which will be made clear hereinbelow. Welded at its upper end to said spacer and extending downwardly a substantial distance therebelow is a fixed pivot supporting arm 99 having a bolt 100 in a lower inturned extremity thereof. Disposed just within the arm 99 and pivotally connected thereto by the bolt 100 is a short link 101. The other end of this link has a bolt 102 on the inner end of which a roller 103 is rotatably mounted and the outer end of which pivotally connects the link 101 with a link 104, the upper end of which is pivotally connected by a bolt 105 to one of the gib plates 83 (Figs. 12 and 13).

The roller 103 extends into a camway 106 formed in a cam 107, upper and lower portions of which are joined as by welding to a vertical channel member 108. This cam has slide plates 109 secured thereto as by bolts 110 so that said plates extend into the grooves 95 whereby the cam 107 is mounted for vertical sliding movement on the frame bars 30. Extending longitudinally from an upper portion of the cam 107 is a pin 111.

Pivotally supported on the pin 111 of the cam 107 is a T-shaped member 115 having a bolt 116 extending upwardly therefrom said member having the upper face 117 covered with a cushion 118 of resilient material such as rubber.

The function of the members 115 is to support opposite ends of the chuck supporting crosshead 74. This crosshead includes a pair of longitudinal bars 119 (Fig. 26) which are held in fixed spaced relation by a pair of hollow spacer blocks 120 which are secured to these plates by cap screws 121. The blocks 120 rest on the rubber cushions 118 and have suitable holes therein for receiving the bolts 116 the latter having coil springs 122 and nuts 123 applied thereto after such assembly, to yieldably hold the blocks 120 downwardly on the cushions 118.

The cap screws 121 (Figs. 13 and 24) also unite the plates 119 to wear fittings 124 having wear blocks 125 which slidably bear against faces 126 of frame standard bars 30. Neither the crosshead plates 119 nor the wear fittings 124 bear against the bars 30 in a manner to restrain the crosshead 74 from freedom to move transversely relative to the standard bars 30.

It is to be noted that each of the crossheads 73 and 74 includes a pair of flat plates of uniform cross section throughout their length the plates in each of these crossheads thus providing a slideway extending substantially from one end to the other. Mounted on said crossheads to slide on said slideways is a series of chuck and driver units 130 (Fig. 1). Each of these units comprises a pair of horizontally shiftable assemblies 131 (Fig. 9) which are reverse duplicates of each other so that a description of one will suffice for both.

Each of the assemblies 131 includes a primary slide device 132 (Fig. 23) which is supported on and adapted to slide longitudinally on one of the nail driver crosshead plates 75, and a secondary slide device 133 (Figs. 10 and 11) which is supported on and, longitudinally slidable relative to one of the bars 119 of the crosshead 74.

It is also to be noted that the devices 132 are disposed inside the plates 75 and the devices 133 are disposed outside of the plates 119.

Each device 132 (Figs. 17, 20, 21, 22, and 23) includes an upper bar 134 and a lower angle bar 135 to which are welded a pair of tubular sleeves 136 and 137. Secured by cap screws 140 to the angle guide bar 135 is a bar 141, which lies directly under and adjacent one of the racks 88, and a retainer plate 142 which extends upwardly opposite said rack and holds the angle bar 135 in snug slidable relation with the crosshead plate 75 (Fig. 23). Journalling in suitable bearings provided in the angle bars 135 of each of the assemblies 131 of each unit 130 is a shaft 143 having pinions 144 fixed thereon which mesh with the gear racks 88 of said units, at least one end 145 of said shaft being squared for the application of a wrench to turn said shaft to slide said unit 130 longitudinally relative to the crossheads 73 and 74.

Provided on the guide bar 134 of each of the primary devices 132 is a lock 146 (Fig. 21). This includes a pair of bolts 147 which pass through said bar, through a pair of rollers 148 resting on the upper edge of the adjacent crosshead plate 75, and through a strap 150, the middle portion of which is bent outwardly. Formed centrally in the strap 150 is a hole 151. Rigidly fixed in the guide bar 134 is a threaded stud 152 which is concentric with hole 151. Resting on the upper edge of the adjacent plate 175 are wedges 153 having cam faces 154 at their inner ends. Apertured, so as to freely receive said stud, and lying inside the strap 150, is a wedge block 155. A sleeve 156 which is tapped to screw onto the stud 152, extends through hole 151 against block 155. This sleeve has a squared head 157 for the application of a wrench thereto.

When sleeve 156 is thus rotated, it forces the block 155 between the wedges 153. This separates these and extends them under the rollers 148 which lifts the angle guide 135 against the crosshead plate 75 thereby locking this device 132 to said plate.

The sleeve 136 has bearing bushings 160 in its upper and lower ends.

Sleeve 137 has a shoulder 161 (Figs. 17 and 23) extending inwardly at the upper end thereof through which a hollow shaft 162 with a cap 163 on its upper end extends downwardly. Compressed between the shoulder 161 and the cap 163 is a rubber ring 164. The lower end of the hollow shaft 162 is threaded to receive a nut 165 which retains on said shaft a free collar 166 and a coiled spring 167, the latter two elements being enclosed within the sleeve 137, and the spring being forced upwardly under an adjusted degree of compression against the shoulder 161.

The secondary slide device 133 of each assembly 131 (Figs. 18, 19, and 22) includes a body 170 of welded construction including a top plate 171, a bottom plate 172, two J-shaped spacers 173, and a crosswise spacer 174. As shown in Fig. 22, the top and bottom plates 171 and 172 are grooved to slidably receive upper and lower edges of adjacent crosshead plate 119. These plates 171 and 172 are also provided with vertically aligned apertures to slidably receive a tubular shaft 175 having a cap 176 on its upper end and which extends downwardly through said apertures in said plates and through the bearing bushings 160 embodied in the upper and lower ends of sleeve 136.

Extending laterally from the bottom plate 172 are spring holding pins 177 and corresponding pins 178 are provided on the cap 176. Coil springs 179 are stretched between the pins 177 and 178, thereby yieldably holding the hollow shaft 175 down with the cap 176 resting on a rubber cushion ring 180 which surrounds said shaft between said cap and the upper plate 171 of each slide device 133. The spacers 173 and 174 (Fig. 19) are also apertured to slidably receive pins 181.

The spacers 173 have openings in their front ends to receive lugs 182 provided on levers 183 which converge outwardly towards a threaded retainer stud 184 which is fixed in the spacer 174 and has a nut 185 which, when screwed on the outer end thereof, presses against the adjacent ends of the levers 183 thus moving the levers 183 against the pins 181 and forcing the latter against the crosshead plate 119 and locking the slide device 133 in place on said plate.

It is to be noted that the squared shaft 145 and the square end 157 and the nut 185 are preferably all made so as to fit by a single wrench.

Supported on the threaded lower ends of the two hollow shafts 162 of each chuck and driver unit 130 is a driver mount 190 (Figs. 3 and 6). This mount comprises a horizontal plate 191 having blocks 192 bolted or welded thereto. These blocks are apertured to receive cap screws 193 which extend freely through the blocks 192 and are screwed into tapped holes provided in blocks 194. The blocks 192 and 194 are bored and tapped at their planes of meeting so that each of these pairs of blocks operates as a split nut into which the threaded lower end of one of the hollow shafts 162 is screwed.

The plate 191 has slots 195 receiving bolts 196, the latter adjustably supporting driver retaining channels 197. Nail drivers 198 are provided, each of these having a body 199 which is apertured at its lower end to receive a punch 200, held in place therein by an "Allen" screw 201. Adjacent its upper end each driver body 199 has a slot 202 whereby the upper ends of said bodies may be slid into the channels 197 with an inturned lip 203 provided along one of the side edges of said channel extending into the slots 202 to unite the drivers 198 with said channels while permitting longitudinal adjustment of the drivers in said channels.

Each of the units 130 is also provided with a chuck mount 210 (Figs. 3, 7, 10, 11, 16, and 22) which includes a pair of angle bars 211 held in spaced relation by four blocks 212 welded thereto so that inturned flanges 213 of said bars are spaced apart to receive bolts 214 therebetween and to provide rests for nuts 215 of said bolts so that the latter may be employed to tightly secure longitudinally slotted supporting arms 216 of chucks 217 to said chuck mount. Secured to the blocks 212 by cap screws 220 are blocks 221 which are closely spaced together and then bored and tapped at their meeting planes to threadedly receive lower ends of the hollow shafts 175 of that unit. The holes in the blocks 221 through which the bolts 220 pass provide a loose fit for said bolts whereby these blocks have a degree of freedom of movement relative to the blocks 212, thereby permitting said blocks 221 to be clamped together on the shafts 175 by pairs of bolts 222 which extend through suitable apertures provided horizontally in the blocks 221.

Each of the nail chucks 217 is supported on one end of its arm 216 in alignment with one of the drivers 198 with the punch 200 slidably extending downwardly into said chuck. These chucks may be of any preferred construction, many variations of which are well known in the art. Each chuck 217 is connected by a flexible tube 223 to a funnel 224, these funnels being secured by clamps 225 (see Fig. 27) to a bracket 226 which is secured by cap screws 227 to an inside face of one of the bars 119 of the crosshead 74. The latter connection is made so as not to interfere with the longitudinal adjustability of those slide devices 133 which are slidable relative to and supported on said bar 119.

Each of the funnels 224 is in vertical alignment with one of the funnels 56 of the nail feed mechanism 51 and tubes 228 are formed on the lower ends of the funnels 56 which extend into the funnels 224 in telescopic relation therewith so that any nail delivered by the mechanism 51 to one of the funnels 56 gravitates rapidly through the tube 228, funnel 224, and flexible tube 223 associated therewith to the corresponding chuck 217.

*Operation*

With the pan 53 charged with nails of the desired size; with the motor 42 energized to continuously rotate the jack shaft 38; with the anvil mount 65 adjusted to the proper height and with the anvils 70 properly spaced upon it; with the chuck and driver units 130 adjusted longitudinally on the crossheads 73 and 74 to properly locate the several driver mounts 190 and chuck mounts 210 of said units; and with the chucks 217 and drivers 198 properly adjusted on said mounts to locate said chucks for driving nails in the desired pattern, the operator inserts the work W to be nailed, into the machine 25 so that the parts to be nailed together rest on the anvils 70 beneath the chucks 217 of the various units 130.

The relationships now existing between the main operating parts of the machine are shown in Figs. 3 and 4. These views show the crossheads 73 and 74 in their uppermost positions. The crosshead 74 is supported by the cams 107 these being shown in their upward positions in Fig. 13.

Those chucks 217 from which it is desired that nails be driven in the nailing operation being described, have already been supplied with one nail apiece, by the automatic nail feeding mechanism 51, incidental to the performance of a previous nailing operation.

The operator now steps momentarily on the pedal 43 which throws in clutch 40, causing the master gear wheels 36 to be given a single revolution, at the end of which the clutch 40 is automatically thrown out. The pitmen 80 act directly on the crosshead 73 to rapidly reciprocate it downwardly and upwardly during said revolution.

During the first part of the downward movement of the crosshead 73 the rollers 103 on link 104 (Figs. 13 and 14) move almost directly downwardly thus moving the cams 107 and crosshead 74 with it. As the links 101 reach their vertical positions the chucks 217 are just brought to rest on the work W as shown in Figs. 8 and 9. The punches 200 are shown in these views as having been extended downwardly into the chucks 217 but not sufficiently to start driving nails therefrom.

As the links 101 swing into vertical position so as to bring the chucks down into contact with the upper face of the work W, curved portions 230 of the cam tracks 106 of the cams 107 become concentric with the bolts 100 about which the links 101 pivot. As shown in Fig. 12, the balance of the downward movement of the crosshead 73 merely shifts the rollers 103 through these curved portions of the camways 106 without having any effect upon the vertical position of the cams 107, the crosshead 74, or the chucks 217 supported by said crosshead.

Figs. 1, 10, and 11 illustrate the completion of the downward movement of the crosshead 73.

The upward movement of the crossheads 73 and 74 at the completion of which the gear wheels 36 are automatically halted, comprises merely a reversal of the downward movement of these crossheads.

In the nailing operation above described, the compensating springs 179 of the secondary slide devices 133 yield upon the chucks 217 engaging the surface of the work if this surface is high enough to halt the downward movement of the chucks 217 before the downward movement of the secondary crosshead 74 ceases. The latter takes place, of course, when the rollers 103, swinging about the axis of the bolts 100, come opposite the curved portions of the camways 106, whereby the cams 107 supporting the crosshead 74 remain stationary during the balance of the downward movement of the crosshead 73.

In case the machine is inadvertently operated where a downward movement of the chucks is halted by some obstacle, at a level substantially above that at which the nailing operation is intended to take place, the machine will be protected from injury not only by the coil springs 179 (Figs. 1 and 18), but by the yielding of the springs 122 through which the crosshead 74 is held downwardly on its T-supports 115.

The compensation by the coiled springs 179 and 122 above described is for the protection of the chucks 217 from injury due to unavoidable variations in the vertical thickness of the work being handled. Due to the light structure of these chucks, springs 179 and 122 are relatively light so that the maximum downward pressure applied to these chucks by said springs is insufficient to do any damage to the chucks. The coiled springs 167 however, are relatively heavy when compared with the springs 179, as may be seen by reference to Figs. 17 and 18. The function of the springs 167 is to yield, in a nailing operation, when the squared shanks 199 of the nail drivers come into contact with the chucks 217 as shown in Figs. 10, 11 and 16 so that no damage will be done to the chucks 217 where the work is thick enough to bring the square shanks 199 down against the chucks before the driver crosshead 73 has reached its downwardmost position, as shown in Fig. 1. The springs 167 must be relatively heavy however so that they will not be made to yield by the resistance to the downward movement of the nail drivers which is offered by the nails being driven thereby.

The outstanding advantage of the present invention is the extreme flexibility it possesses in the choice afforded in making up the pattern in which the nails are driven from the chucks 217. Among the factors contributing to this are the placing of the chuck supporting crosshead above the driver crosshead, forming the two crossheads with longitudinal slideways and then mounting the driver and chuck nail driving devices on a plurality of units which are individually shiftable along said slideways into any desired relationship in the formation of the nail driving pattern.

This flexibility in disposing the independent groups of nailing devices is supplemented by the wide variety of choices which the operator may make in disposing the nail driving devices within each of these groups. Contributing to this latter feature is the unique manner in which the nail driver supports 197 may be selectively positioned in any possible grouping within the range of the slots 195 through which the bolts 196 extend for securing said driver supports to the plates 191. The adjustability of the mountings of the chucks 217 permits the positions of these to be correspondingly altered so that wherever the drivers 198 may be located on the mounts 190 the chucks associated with these drivers will be in true vertical alignment therewith which, of course, is necessary for the cooperation of these elements in the nailing operation.

In Fig. 4, six pairs of nail drivers and chucks are shown arranged fairly compactly and it is evident that there is considerable latitude here for longitudinal adjustment of these elements on their respective supports for correspondingly varying the pattern in which the nails will be located which are driven from these chucks.

Not only is the range in which the location of the nail driving devices of the invention may be varied an important feature of the invention, but the value of this feature is enhanced by the speed with which these changes may be effected. In this connection it might be pointed out that the squared heads 145, 157, and 185 (see Fig. 4) are all made to be fit by a single wrench (not shown) so that a change in the longitudinal position of any unit 130 may be rapidly effected by first relaxing the clamp devices of the respective assemblies 132 and 133 of said unit by the successive application of said wrench to said squared heads 157 and 185 thereof, and then applying said wrench to one of the squared heads 145 of this unit 130 to slide the unit to the new position desired. Having made this adjustment, the wrench is then rapidly applied in succession to the squared heads 157 and 185 of this unit to tighten up the clamping devices thereof, thereby fixing this unit in its new position.

The claims are:

1. In a nailing machine the combination of: a frame including a base and a pair of parallel standards rising upwardly from said base and rigidly secured thereto, each of said standards being formed of a pair of smooth bars of uniform cross section connected at the top with each other and with the bars of the other standards; an anvil structure including a pair of flat plates connected together in spaced relation, opposite ends of said plates sliding on outside faces of the bars of said standards; clamp means for adjustably clamping said end portions of said plates to said standard bars to fix said anvil structure on said standards at a selected level; anvils shiftable longitudinally on said plates for supporting portions of work through which nails are to be driven downwardly; a nail-driver cross-head including a pair of spaced plates, corresponding opposite ends of which are joined together and are vertically slidable on said standards; a chuck-supporting cross-head including a pair of spaced plates opposite ends of which are connected and are guided vertically by the bars of said standards; a power mechanism on said frame for reciprocating said nail-driver cross-head vertically for each nail driving operation; cam devices for connecting corresponding ends of said two cross-heads to effect a coordinate vertical reciprocation of said chuck supporting cross-head with each of the aforesaid reciprocations of said nail driving cross-head; a series of chuck-and-driver units slidably supported on said cross-heads and having clamps for fixing the positions of said units on said cross-heads, said clamps, when relaxed, permitting the placing of said nail-and-chuck units in any desired groupings throughout the length of said cross-heads.

2. In a nailing machine the combination of: a frame including a base and a pair of parallel standards rising upwardly from said base and rigidly secured thereto, each of said standards providing vertical slide ways; an anvil structure mounted on said frame for supporting the work while nails are being driven therein; a nail-driver cross-head including a pair of spaced plates, corresponding opposite ends of which are connected together and vertically guided by said slide ways; a chuck supporting cross-head including a pair of spaced plates corresponding opposite ends of which are connected and are guided by said standard slide ways; a power mechanism on said frame for coordinately reciprocating said two cross-heads vertically to accomplish a nail driving operation; and a series of chuck-and-driver units slidably supported on said cross-heads so as to be shiftable longitudinally of said crossheads into any desired groupings throughout the length of said cross-heads, each of said units including a chuck and a nail-driver, said chuck being supported on said chuck crosshead and said driver being supported on said nail-driver crosshead.

3. A combination as in claim 2 in which said chuck-crosshead is disposed above said nail driving crosshead and in which each of said chuck-and-driver units includes a pair of primary slide devices which are slidable respectively on the aforesaid plates of said nail-driver crosshead, each of said primary devices having two vertical bearings; a pair of driver support shafts; a pair of chuck support shafts, one shaft of each of said pairs of shafts being vertically slidable in one of said bearings of each of said primary devices; a pair of secondary slide devices which are slidable respectively on the aforementioned plates of said chuck supporting crosshead, each of said secondary devices having a bearing in which one of said chuck support shafts is vertically slidable; caps on said driver support shafts retaining the latter in their respective primary device bearings; caps on said chuck-support shafts retaining the latter in their respective secondary device bearings; compensator spring means on said slide devices for yieldably resisting upward movement of each of said shafts relative to the particular bearing in which said shaft is retained by its cap as aforesaid, said spring means on said primary slide devices being relatively heavy and said spring means on said secondary slide devices being relatively light; a driver mount supported on and uniting lower ends of said driver supporting shafts; a plurality of nail-drivers adjustably carried by said mount and depending therefrom; a chuck mount supported on and uniting lower ends of said chuck supporting shafts; a plurality of chucks disposed in vertically slidable relation with said drivers; and means for adjustably securing said chucks on said chuck mount.

4. In a nailing machine the combination of: a frame; a nail-driver crosshead; a chuck supporting crosshead disposed above said nail driver crosshead, said crossheads being guided vertically at their opposite ends on said frame, said crossheads having co-extensive longitudinal guideways for a major portion of their length; a driver-chuck unit supported on said crossheads and shiftable as a unit on said guideways thereof, said unit including slide clamp means slidable on said driver crosshead; a driver mount and a chuck mount below said driver crosshead, spring compensator means on said slide clamp means and connected to said driver mount to support the latter and yield when said mount sustains on excessive pressure in nailing, a plurality of drivers adjustably mounted on and depending from said mount, bearing means on said slide clamp means, a slide device slidable on said chuck supporting cross-head, spring compensator means mounted on said device and having shaft means slidable in said bearing means and connected to said chuck mount to support the latter, yet adapted to yield when said chuck mount sustains a relatively small pressure in a nailing operation, a plurality of chucks adjustably mounted on said chuck mount in vertically sliding relation respectively with said drivers; and a power mechanism on said frame for imparting coordinate vertical reciprocations to said cross-heads to effect a nailing operation.

5. A combination as in claim 4 in which said slide clamp means is provided with a control shaft carrying pinion means; and rack means provided on said driver crosshead, said pinion means meshing with said rack means and shifting said driver-chuck unit on said crossheads when said control shaft is rotated.

6. A nailing machine, the combination of: a base; a pair of standards rising from said base; anvil means disposed between said standards; a nail driver cross-head; a chuck supporting crosshead disposed above said nail driver crosshead, said cross-heads being guided vertically by said standards; shafts supported on said chuck supporting crosshead, said shafts extending downwardly through and in slidable relation with said nail driver crosshead to a level below the latter; chucks mounted on the lower ends of said shafts; nail drivers mounted on said nail driver crosshead and extending downwardly therefrom into slidable relation with said chucks; and means for coordinately reciprocating said crossheads to effect a nailing operation on work resting on said anvil means.

7. In a nailing machine the combination of: a frame; a nail-driver crosshead including a horizontal pair of spaced plates connected at their opposite ends and guided vertically on said frame; a chuck supporting crosshead disposed above said nail-driver crosshead and including a horizontal pair of spaced bars connected at their opposite ends and guided vertically on said frame, said crossheads being parallel, said bars being closer together than said plates and equi-distant from the vertical plane which bisects the space between said plates; a chuck-and-driver unit which is slidably supported on said crossheads for adjustment longitudinally on the latter, said unit including a pair of primary slide devices which are disposed inwardly from and slidable respectively upon the aforesaid plates, each of said devices having two vertical bearings, a nail-driver compensator shaft being mounted in one of said bearings with a stiff compensator spring biasing said shaft downwardly; a nail-driver mount for each such unit connecting at its end portions with lower ends of said compensator shafts of said unit so as to be supported on said shafts, said driver mount having a driver supporting slideway; drivers shiftably supported on said driver mount in said slideway; a pair of secondary slide devices disposed outwardly from and slidable respectively upon the aforesaid bars of said chuck supporting crosshead, each of said secondary devices providing a bearing; chuck supporting shafts sliding vertically in the other of said primary devices bearings and in said secondary devices bearings; springs biasing said chuck supporting shafts downwardly; a chuck mount opposite ends of which connect to and are supported on the lower ends of said chuck supporting shafts; a plurality of chucks slidably associated with said drivers; means for adjustably securing said chucks onto said chuck mount; and power mechanism for coordinately reciprocating said two crossheads vertically with reference to a piece of work disposed therebeneath to accomplish a nailing operation thereon.

8. A combination as in claim 7 in which racks are provided on corresponding edges of said plates of said nail-driver crosshead; aligned bearings provided on the aforesaid primary slide devices; a control shaft journalling in said bearings; pinions on said control shaft meshing with said racks; means for rotating said control shaft to shift said chuck-driver unit longitudinally on said crossheads; and clamp means provided on said unit for selectively clamping the same in a fixed position relative to said crosshead plates.

9. A combination as in claim 7 in which said chuck mount is offset from under said nail-driver mount; chuck supporting arms one of which extends laterally from each of said nail chucks and is provided with a longitudinal slot therein; and bolt means shiftable longitudinally on said chuck mount and extending through said slots in said arms to adjustably secure said chucks to said chuck mount in any position permissible for said chucks within the range of their adjustability on said mount.

10. In a nailing machine, the combination of: a frame; a nail-driver crosshead guided vertically at its opposite ends on said frame and having a slideway extending substantially the length thereof; a chuck support crosshead mounted for vertical reciprocation above said nail-driver crosshead, said chuck supporting crosshead having a slideway extending substantially the length thereof; means for co-ordinately reciprocating said crossheads vertically; and a series of driver chuck units mounted on said cross heads and freely adjustable longitudinally relative to the latter along said slideways, each of said units comprising a primary slide device slidable on said nail-driver crosshead slideway, a secondary slide device slidable on the chuck supporting crosshead slideway, vertical bearing means on said primary slide devices, shaft means slidable in said bearing means, said shaft means being suspended from said secondary slide device and extending slidably downwardly through said bearing means, means for supporting a chuck on the lower end of said shaft means, and a driver mounted on said primary slide device and extending downwardly therefrom into slidable nail-driving relation with said chuck.

11. A combination as in claim 10 in which said chuck supporting cross head is guided on said frame in a direction parallel with said nail driver crosshead and is free from guidance in a transverse direction.

12. A combination as in claim 10 in which said primary slide device is provided with a clamp for clamping said device to said crossheads to maintain any desired longitudinal relationship between said units and said crossheads.

13. A combination as in claim 10 in which said primary slide device is provided with a stiff compensator spring, said driver being mounted on said spring whereby the latter yields upon said driver meeting an excessive resistance in a nailing operation.

ERNEST A. VERRINDER.
REGINALD H. HEARD.

REFERENCES CITED

The following references are of record in the file of this patent:

UNITED STATES PATENTS

| Number | Name | Date |
|---|---|---|
| 2,488,757 | Benson | Nov. 22, 1949 |